INVENTOR:
BOBBY GENE HUBBARD
BY Charles B. Haverstock
ATTORNEY.

Oct. 1, 1968 B. G. HUBBARD 3,404,287

RING COUNTER

Filed July 8, 1964 3 Sheets-Sheet 2

INVENTOR:
BOBBY GENE HUBBARD
BY Charles B. Haverstock
ATTORNEY.

INVENTOR:
BOBBY GENE HUBBARD
BY Charles B. Haverstock
ATTORNEY,

United States Patent Office 3,404,287

Patented Oct. 1, 1968

3,404,287

RING COUNTER

Bobby Gene Hubbard, Florissant, Mo.
(2615 Park Ave., Cairo, Ill. 62914)

Filed July 8, 1964, Ser. No. 381,065
14 Claims. (Cl. 307—223)

ABSTRACT OF THE DISCLOSURE

A multi-stage ring counter circuit employing a single silicon controlled rectifier in each counter circuit stage, the circuit being characterized by the fact that the active stage or stages are those in which the silicon controlled rectifier is non-conducting. The circuit is also characterized by coupling the anodes of the rectifiers in adjacent stages through circuits which include a capacitor in series with a diode so connected that when a non-conducting rectifier goes into a conducting condition it establishes a path for discharging the capacitor and dissipating the change on the anode of the rectifier in the succeeding stage to cause the said rectifier in the succeeding stage to become non-conducting. The present circuit is also distinguished by novel means for stepping, shifting, stopping and resetting the counter and the counter stages.

The present invention relates generally to sequential conuting and control devices and circuits and more particularly to a circuit for applying output signals or voltages to a plurality of load circuits in a predetermined sequence or in repeating sequences.

Counting and other circuits for operating devices or loads in predetermined sequence have long been known and are used for many different devices and applications. Ring counters have also been used for sequentially applying energy to a plurality of loads. However, the known counting and sequencing circuits and the known ring counters are objectionable and not suitable for many purposes and applications because they lack versatility, they are unable to skip operations or to take succeeding operations simultaneously, they are subject to sudden relatively large changes in current flow if fired by transients, and failures in the known devices are relatively more likely to cause damage than in the subject device. For these and other reasons the known devices and ring counters are limited in their usefulness and cannot be used for many applications and purposes. The present ring counter overcomes these and other shortcomings and disadvantages of the known circuits and provides improved and more versatile operating characteristic therefor. The subject ring counter is also more stable and less sensitive to spurious signals, is able to make certain operations occur simultaneously and repetitiously as desired.

It is therefore a principal object of the present invention to provide an improved and more versatile ring counter circuit.

Another object is to provide a ring counter that is relatively stable, reliable and unaffected by spurious signals.

Another object is to provide a ring counter capable of simultaneously controlling the performance of more than one function.

Another object is to provide a ring counter that is not subject to wide variations in power requirement.

Another object is to increase the utility of ring counter circuits and the like.

Another object is to expand the sequential combinations and controls capable of being produced by a ring counter.

Another object is to provide a ring counter circuit that can be constructed and expanded to have any desired number of stages.

Another object is to provide a relatively inexpensive, compact, and lightweight control circuit having wide application.

These and other objects and advantages of the present invention will become apparent after considering the following detailed description covering several embodiments thereof in conjunction with the accompanying drawings, wherein.

Figure 1:
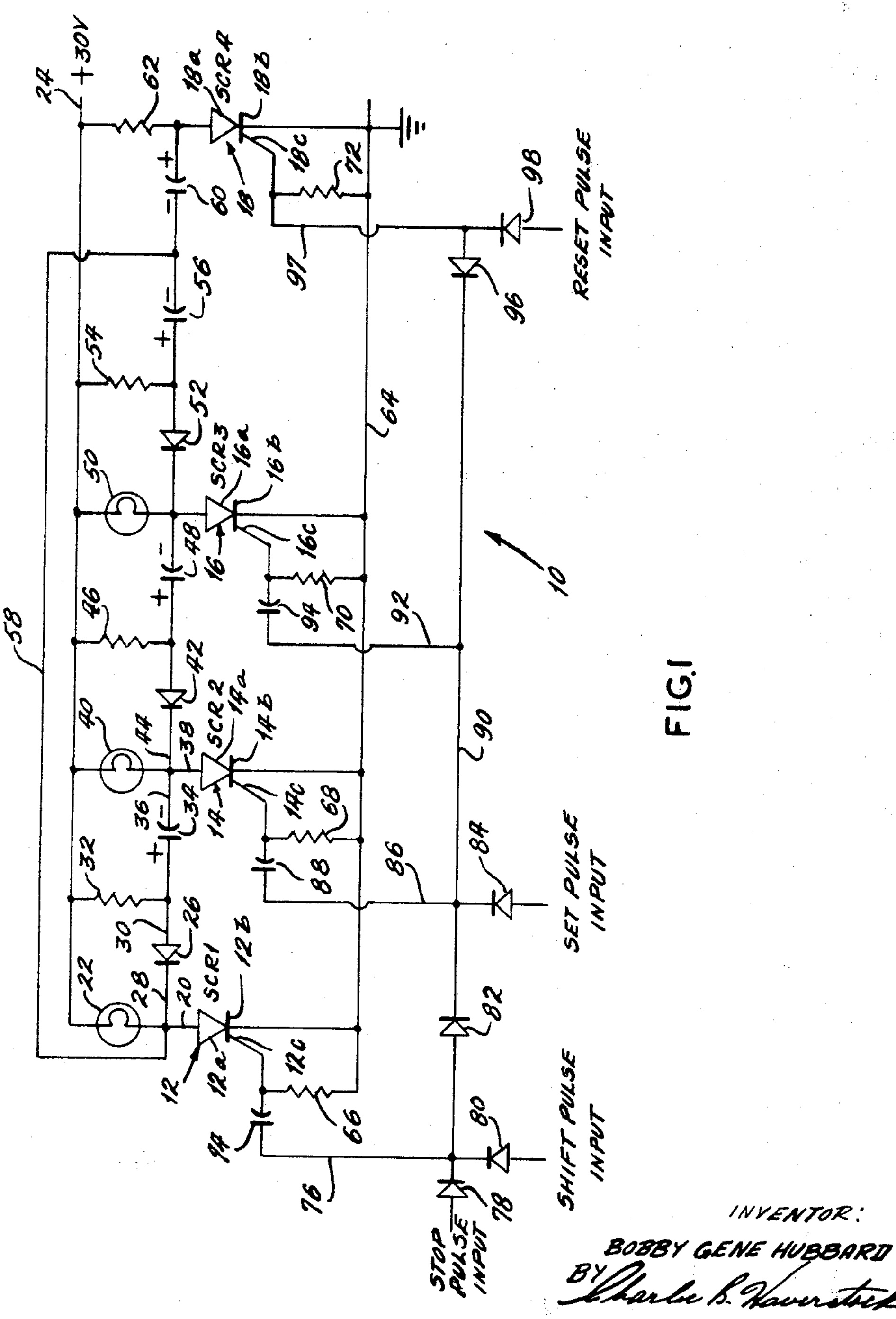
FIG. 1 is a schematic circuit diagram showing a three-stage ring counter circuit constructed according to the present invention.

Referring to the drawings by reference numbers, number 10 refers to a three-stage ring counter circuit constructed according to the present invention. The circuit 10 has a first silicon controlled rectifier (SCR) 12, a similar second stage SCR 14, and a third stage SCR 16. The circuit 10 also has a fourth SCR 18 which is included for reset purposes as will be described hereinafter. It will also be shown later that the subject circuit can be expanded to have any number of similar stages depending upon the load circuit requirements and other operation and functional considerations.

The first stage SCR 12 has an anode **12*a* which is connected by lead 20 to an indicator light 22. The opposite side of the indicator light 22 is connected to a power supply lead 24 which for illustrative purposes is shown as being at +30 volts. The lead 20, which is connected to the anode 12*a*, is also connected to one side of a diode rectifier 26 by a lead 28, and the opposite side of the diode rectifier 26 is connected by lead 30 to one side of a resistor 32 and to one side of a capacitor 34. The other side of the resistor 32 is connected to the power supply lead 24 and the other side of the capacitor 34 is connected by leads 36 and 38 to the anode 14*a* of the second stage SCR 14. The anode 14*a* is connected to another indicator light 40 and to one side of another diode rectifier 42 by lead 44. The opposite side of the rectifier 42 is connected to one side of another resistor 46 and to one side of another capacitor 48. The other side of the capacitor 48 in turn is connected to the anode 16*a* of the third stage SCR 16**.

The third stage SCR 16 also has an associated indicator light 50 which is connected between its anode **16*a* and the power supply lead 24, and another connection is provided between the anode 16*a* and one side of another diode rectifier 52. The opposite side of the diode rectifier 52 is connected to another bias resistor 54 and to one side of another capacitor 56. The opposite side of the capacitor 56 is connected by lead 58 to the anode 12*a* of the first stage SCR 12. The connection 58 closes the loop which forms the ring circuit portion of the subject circuit and enables the circuit to repeat a sequence automatically as additional input signals are received. The capacitor 56 is also connected to one side of another capacitor 60 which has its opposite side connected to one side of yet another load resistor 62 and to the anode 18*a* of the reset SCR 18**.

The SCR's 12, 14, 16 and 18 also have base elements which are identified by the same number as the SCR followed by small letter *b* and all of the bases are grounded to a lead 64. In addition, each has a second base connection or terminal identified as terminals **12*c*, 14*c*, 16*c* and 18*c*. These terminals are the input or control terminals for the SCR's, and each terminal 12*c*, 14*c*, 16*c* and 18*c* is shunted to ground by a corresponding bias resistor 66, 68, 70 and 72**, respectively.

The terminal 12_c_ of SCR 12 is connected to one side of an input coupling capacitor 74 and the opposite side of the capacitor 74 is connected by lead 76 to a common connection between two input diode rectifiers 78 and 80. The lead 76 is also connected to a third diode rectifier 82. The other side of the diode rectifier 82 is connected to the output side of another diode rectifier 84 and to a lead 86 which is connected to one side of an input coupling capacitor 88 for the second stage SCR 14. The opposite side of the coupling capacitor 88 is connected to the input terminal 14_c_ of the second stage SCR 14.

The output sides of the diode rectifiers 82 and 84 are also connected by other leads 90 and 92 to one side of an input coupling capacitor 94 for the third stage SCR 16 in a manner similar to that described above for the second stage.

Yet another diode rectifier 96 is connected to the leads 90 and 92 and its opposite side is connected by lead 97 to terminal 18_c_ of the reset SCR 18 and also to the output side of another diode rectifier 98. The opposite side of the last named rectifier 98 is connected to a source of reset pulses.

The diode rectifier 78 has an input side which is connected to an input source of control pulses labeled Stop Pulse Input which will be described later. Similarly, the input side of the diode rectifier 80 is connected to a source of input signals labeled Shift Pulse Input which is used to step or sequence the ring counter circuit. The diode rectifier 84 also has its input side connected to a source of pulses labeled Set Pulse Input. The pulses fed to and through the rectifiers 78, 80, 84 and 98 control the operation of the ring counter circuit 10.

In the particular circuit shown in FIG. 1 the three SCR's 12, 14 and 16 form a three stage ring counter, and the SCR 18 is provided for reset purposes. The reset SCR 18 is not, however, essential to the operation and is not needed for all applications of the subject ring counter circuit. When power is applied to the circuit none of the SCR's will initially conduct, and to commence operation a positive pulse must be applied at the set pulse input at the input side of the diode rectifier 84. This positive pulse is applied to the control terminals of all but one of the ring counter stages and causes all but the said one stage to conduct. In FIG. 1 the set pulse is applied to the control terminals 14_c_ and 16_c_ of SCR's 14 and 16 respectively, but is not applied to the terminal 12_c_. Therefore, SCR 12 remains in a non-conducting condition and is the active SCR, while the SCR's 14 and 16 are the inactive SCR's and conduct. When SCR's 14 and 16 conduct current flows through their associated indicator lights 40 and 50 to provide a visual indication of the condition of the circuit. The set pulse cannot be applied similarly to the element 12_c_ because of the polarity of the diode rectifier 82 which prevents it.

One of the unique features of the subject ring counter circuit is that the operating or active SCR is the only one that is non-conducting. All of the other SCR's in the ring counter circuit itself conduct except when they are operating. This is important because it means that stray signals or noise can have little or no effect on the circuit and cannot upset the normal operation of the circuit or create sudden relatively large power demands as is true of known ring counter circuits. In this connection it should be noted that at worst, random noise or signals can effect only one stage since all of the other stages are already conducting. Therefore, even if a random signal were to affect the active stage it would have the minimum adverse effect of making only that stage inactive or conducting rather than active. This is an important safety provision because it means that the load circuit or device controlled by the active stage will be turned off instead of on.

After the circuit is in operating condition, positive pulses are applied at the Shift Pulse Input and at the input side of the diode rectifier 80 to sequence the circuit. The first of these pulses is applied to the terminal 12_c_ of the SCR 12 to trigger or turn on the SCR 12 and causes it to conduct. When the SCR 12 conducts it will also energize its associated light 22.

Prior to the conduction of SCR 12, and while SCR 14 was still conducting, the capacitor 34, which is between the affected stages is charged in the polarity shown on the drawing through a circuit including the resistor 32 and the SCR 14. When SCR 12 conducts, however, the capacitor 34 will be discharged through a circuit including the SCR 12 and the diode rectifier 26, which rectifier has a suitable polarity for this purpose. This in turn produces a negative voltage on the anode 14_a_ of the SCR 14 causing SCR 14 to be cut off or to go from a conducting to a non-conducting condition. When this occurs, the lamp 40 is deenergized and remains so as long as the SCR 14 is non-conducting. Subsequently, when the next positive shift pulse comes along it will be applied to the input terminal 14_c_ of SCR 14, which is non-conducting, through the rectifiers 80 and 82 and the capacitor 88. This causes the SCR 14 to again be turned on to start conducting. However, this time when SCR 14 conducts, the capacitor 48 instead of the capacitor 34 will be discharged. The discharge circuit for the capacitor 48 will be through the diode rectifier 42 and the now conducting SCR 14. This causes the third stage SCR 16 to have a negative anode voltage and to be cut off. This also turns off the associated third stage indicator light 50.

Before the SCR 14 conducts, however, the capacitor 34 will be charged to the opposite polarity indicated on the drawing. Capacitor 34 charges through a circuit including the elements 40, 26 and 12, said element 12 being in a conducting condition. When SCR 14 conducts, the diode rectifier 26 prevents the capacitor 34 from being discharged across the SCR 12. Thus when SCR 14 is energized to conduct, it operates to turn off SCR 16 but not SCR 12.

If the number of stages in the ring counter are expanded the same principles of operation apply, and all of the SCR's except one will be in a conducting condition at all times. It should also be noted that the positive pulses which are applied at the shift pulse input are applied simultaneously to the terminals 12_c_, 14_c_ and 16_c_. However, since only one of the SCR's is nonconducting at any one time, only one non-conducting SCR will be affected by each shift pulse.

The capacitors 74, 88 and 94 are coupling capacitors on the control circuits of the respective SCR's and they allow the input impulses to be applied to the SCR's. The capacitors 74, 88 and 94 also have the desirable effect of equalizing the charges that are applied to each of the SCR's and this tends to minimize any effects that may result from unequal loading of the various stages due to variations in the gate impedances of the loads and so on.

When SCR 16 is the only non-conducting SCR, the next succeeding shift pulse will apply a positive voltage to the terminal 16_c_ to cause SCR 16 to conduct. This time when SCR 16 conducts the capacitor 56 is discharged through a circuit including the diode rectifier 52. In addition to this, a negative voltage is applied to the anode 12_a_ of SCR 12 causing the SCR 12 to be cut off or made non-conducting. At the same time, the diode rectifier 42 prevents the capacitor 48 from being discharged across the SCR 14. The succeeding positive shift pulses repeat the operation sequence described above. Furthermore, by controlling the time between succeeding shift pulses the time of each operation can also be controlled and many devices are available for supplying the timed shift pulses.

Figure 2:
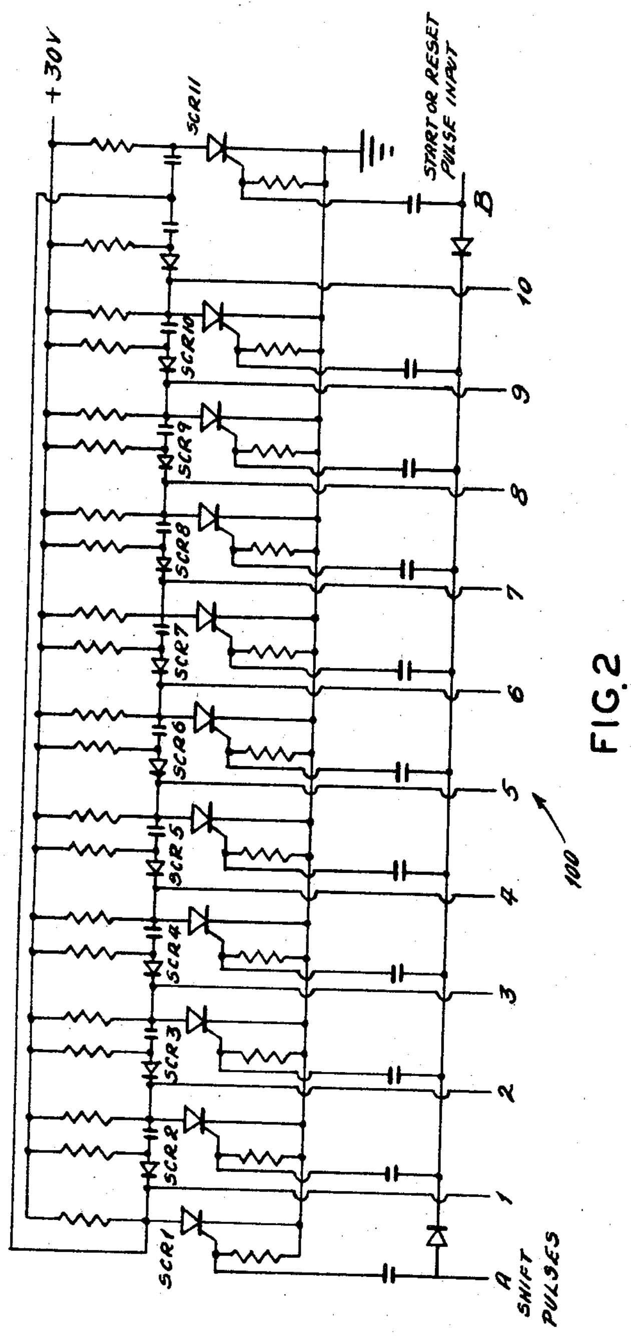
FIG. 2 is a schematic circuit diagram showing a ten stage ring counter constructed according to a modified form of the subject invention.

As already noted, the subject ring counter can be constructed to have any number of stages depending on the output requirements and the number of operations to be controlled. FIG. 2, for example, shows a ten stage ring counter circuit 100 using ten counting SCR's and one reset SCR. Such a circuit can be used for many different purposes including being used as a decade counter. It can also be used with or without indicator lights. The subject counter circuits can also be used for many other operations and control purposes including being used as a timing device, as sequential control means where certain operations are timed, and for many other operations, and SCR's of widely varying capacities are commercially available and enable the subject circuit to be used for controlling loads requiring large as well as small currents.

Referring again to FIG. 1, if it is desired to reset the circuit at any time or for any purpose, a reset pulse can be applied manually or automatically at the input side of the diode rectifier 98. The reset pulse is also applied simultaneously to the terminals 14*c*, 16*c* and 18*c*. However, the reset pulse cannot be applied to the terminal 12*c* of the SCR 12 because of the blocking action of diode rectifier 82. The reset pulse therefore turns on SCR's 14, 16 and 18 causing them to conduct and the capacitor 60 acts to place a negative or substantially reduced voltage on the anode of the SCR 12 causing the SCR 12 to be cut off. The condition described takes place if, at the time the reset pulse is applied, the SCR 12 is conducting because then the capacitor 60 will be charged to the polarity shown and a negative charge will be applied to the anode 12*a*. However, if the SCR 12 is non-conducting at the time that the reset pulse causes SCR 18 to conduct, then the capacitor 60 would not be charged, but in this situation it is not necessary that it be charged since SCR 12 is already non-conducting which is the condition desired to be produced by the reset operation.

After SCR 18 conducts during a reset operation and turns off the SCR 12, the capacitor 60 will charge in the reverse polarity to that shown in the drawing. In this situation, the next succeeding shift pulse will cause the SCR 12 to conduct in the usual manner and will also cause the capacitor 60 to discharge through the conduction of the SCR 12. This in turn will cause the SCR 18 to be turned off or made non-conducting in preparation for a later reset operation. The diode rectifier 96 is included to prevent interference between the shift pulses and the reset circuits and to prevent false resets.

The subject circuit also includes means to stop the circuit and to have all of the indicator lights turned on. This can be accomplished by applying a positive pulse to the stop pulse input which is connected to the input side of the diode rectifier 78. This input impulse will stop the circuit with all of the lamps 22, 40 and 50 turned on and will keep the circuit stopped until a pulse is applied at the reset pulse input. Thereafter, the circuit will again commence to operate when pulses are applied by the shift pulse input as discussed above. The pulses applied by the stop pulse input are applied simultaneously to the terminals 12*c*, 14*c* and 16*c* of SCR's 12, 14 and 16 and are of long duration to hold the SCR's in a conducting condition even after the capacitors 34, 48 and 56 have discharged. The duration of the stop pulse impulses and the reset pulse impulses will depend upon the parameters of the capacitors 34, 48 and 56, and this in turn will depend upon the frequency and requirements of the associated circuits and lights. For example, the capacitors 34, 48 and 56 must be large enough to reverse bias the SCR's long enough to cut them off and the cut off times will depend upon the characteristics of the associated SCR's. The particular circuit shown in FIG. 1 is designed primarily to operate at a relatively low frequency in the neighborhood of approximately 60 cycles. It can be designed, however, to operate at many other frequencies as well.

Inasmuch as the subject circuit is designed to operate with most of the SCR's in a conducting condition rather than in a non-conducting condition, it is usually desirable after power is applied to make sure that all of the conducting SCR's are turned on as soon as possible in order to prevent a wide range of current variation from the power supply under operating conditions. If this is done, the current can not fluctuate by more than the current required to operate one of the indicator lights. This is because all but one of the lamps are on at all times except during a stop pulse operation when all of the lamps are on.

Even though the subject ring counter is operated with most of its SCR's conducting this is usually not a disadvantage because the total current flow is generally small. For example, if the subject circuit is used in conjunction with a logic circuit or the like, the holding current requirements of the individual SCR's may be in the order of a milliamp or less. Thus, even a ten position counter circuit will draw in total only about 10 milliamperes or less. The advantages obtained by having all but one or so of the SCR's conducting, however, are substantial because it minimizes the damage or errors that can be caused by transients or other extraneous pulses and noise, and furthermore if an undesirable signal should occur it can only effect the non-conducting SCR which in the subject circuit turns it off rather than on and therefore is a safety feature. The current drain caused by turning on one additional SCR is also relatively negligible making the subject circuit free from wide current fluctuations.

Figure 3:
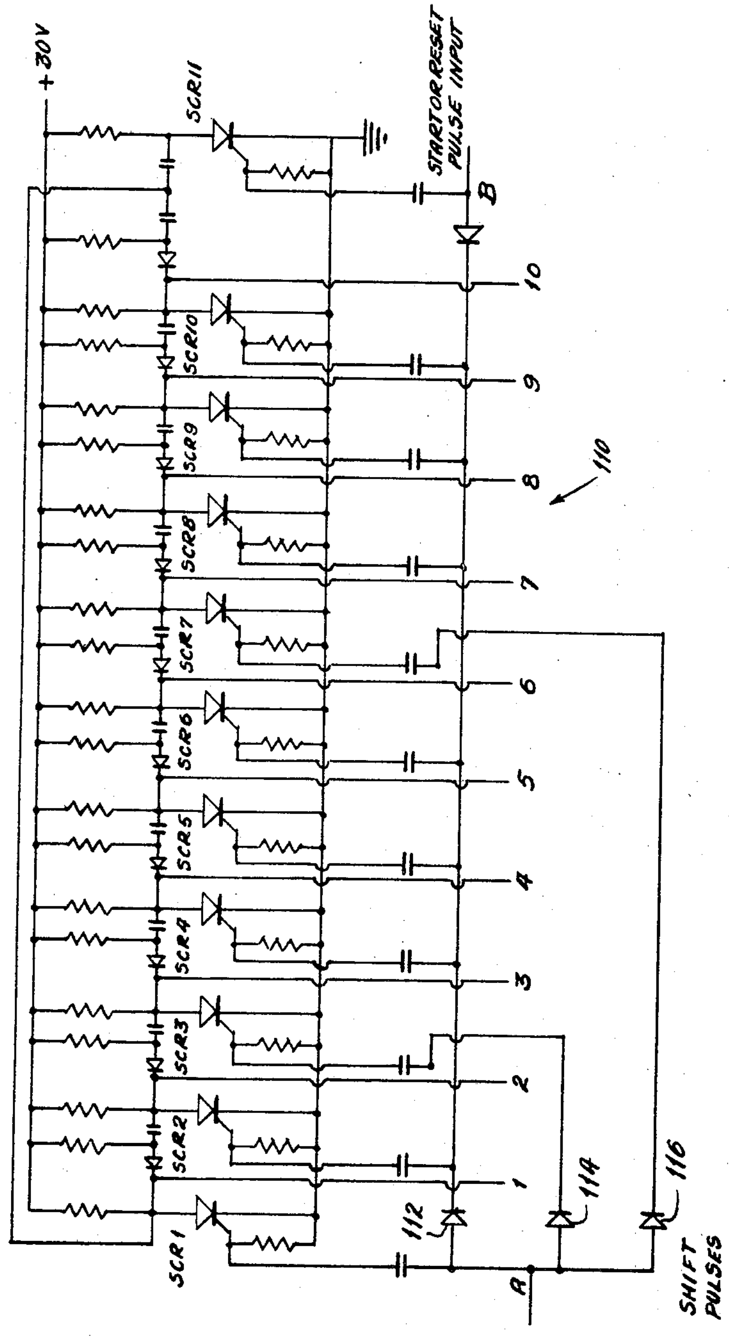
FIG. 3 is a schematic circuit diagram showing a ring counter circuit having stages capable of being operated simultaneously.

It is possible to modify the subject circuit so that two or more SCR's are simultaneously in a non-conducting condition. This increases the flexibility and utility of the circuit and reduces the time required to perform certain types of operations. FIG. 3 shows a ten stage counter circuit 110 which is similar to the circuit 100 shown in FIG. 2 but modified so that three stages are simultaneously in a non-conducting condition. The initial non-conducting stages are stages 1, 3 and 7 which are energized through diode rectifiers 112, 114 and 116 respectively. The modified circuit operates by having the pattern of conducting and non-conducting stages shift one stage to the right each time a shift pulse occurs. For the modified circuit to operate, however, it is usually necessary for the non-conducting stages to be separated by at least one conducting stage. Various combinations of conducting and non-conducting stages are possible using the principles of the modified circuit of FIG. 3, and such circuits have many possible applications such, for example, as for shift registers or other control circuit applications.

Ring counter circuits constructed according to the present invention have many other possible uses and applications including being used in control circuits for welders or the like including seam welders which require a plurality of different operations some of which must be timed and operated in a particular sequence. The subject circuits can also be used to control digital clocks, analogue functions generators, pulse train generators, circuits requiring parallel-to-series readout, data conversion equipment, shift register circuits, circuits requiring positive voltage outputs such as are used to trigger devices and operate gates, circuits where no signal inversion is necessary, circuits where operations are to be performed simultaneously and in repeating sequences and in many other applications. The subject device can also be used in any circuit where accurate timing and operational sequence are important. The above enumeration of possible applications for the subject circuit is not intended, however, as an exhaustive list but merely to suggest general areas where the circuit can be used.

The subject circuit also has the advantage that it is relatively inexpensive to construct and is stable. Furthermore, the circuit does not require the use of any inductors and does not produce commutation pulses across loads not being switched. As already noted above, failures in the operation of the subject circuit caused by spurious signals and noise are not troublesome because of the fail safe feature provided by having most of the SCR's conducting at all times, and failures which do occur are of a relatively minor nature because they only affect the non-conducting SCR's which are usually in the minority. The subject device also has the advantage of being capable of bidirectional counting and can count in a forward as well as a reverse direction without adding any additional stages.

Thus there has been shown and described a novel ring counter circuit which fulfills all of the objects and advantages sought therefor. Many changes, variations, modifications and other uses and applications of the subject circuit, however, will become apparent to those skilled in the art after considering this specification and the accompanying drawings. All such changes, variations, modifications and other uses and applications which do not depart from the spirit and scope of the invention are deemed to be covered by the invention which is limited only by the claims which follow.

What is claimed is:

1. A circuit for controlling the performance of a plurality of operations in a predetermined sequence comprising a plurality of silicon controlled rectifier devices connected in adjacent circuit stages, each rectifier device having anode, cathode and control elements, said rectifiers being capable of being in a conducting or a non-conducting condition, means for simultaneously energizing a plurality of said rectifier devices to cause said rectifiers to be in their conducting conditions, means to prevent at least one of said rectifier devices from conducting, means for energizing said non-conducting rectifier to cause it to conduct, and other means including a diode and a capacitor in series connected between the anode elements of the controllable rectifier devices in adjacent circuit stages, said capacitor being connected to be charged by the voltage on the anode of the rectifier device to which it is connected whenever said rectifier device is in a conducting condition, said diode being connected to discharge said capacitor through the non-conducting rectifier device each time the non-conducting device is energized and goes from a non-conducting to a conducting condition.

2. The circuit defined in claim 1 wherein said plurality of rectifier devices are connected in a closed loop circuit, said means for energizing the non-conducting rectifier including a source of input pulses and means connecting said source to the control elements of all of said rectifiers.

3. A circuit comprising a plurality of stages each including a silicon controlled rectifier device having an anode connection, a control connection and a grounded cathode connection, means coupling said stages together into a closed circuit, means for simultaneously energizing the control connections of a plurality of said controllable rectifier devices to cause said devices to conduct, other means including a series circuit including a diode and a capacitor connected between the anode of the rectifier devices in succeeding stages for substantially lowering the anode voltage of at least one of said devices to cause said device to stop conducting, a source of input pulses connected to the control connections of said devices, the first input pulse energizing said non-conducting semi-conductor device to cause it to conduct whereby, said newly conducting devices establishes a circuit through the said series circuit to substantially lower the anode voltage of the rectifier device in the succeeding stage to cause it to stop conducting, each succeeding input pulse energizing the then non-conducting device, whereby each of said plurality of semi-conductor devices, in sequence, becomes non-conducting.

4. The circuit defined in claim 3 including reset means for restoring the circuit to a predetermined condition in which a selected one of said rectifier devices is non-conducting.

5. The circuit defined in claim 3 including means for applying a control impulse of relatively long duration simultaneously to all of said rectifier devices to cause all of said devices to conduct simultaneously.

6. The circuit defined in claim 3 wherein said rectifier devices are silicon controlled rectifiers.

7. The circuit defined in claim 3 wherein a light source is connected in circuit with each of said rectifier devices, said light sources being energized only when the associated rectifier devices are conducting.

8. A ring counter for controlling the operation of a plurality of individual elements in a predetermined sequence comprising a plurality of controllable rectifier devices connected in succeeding circuit stages, each of said rectifier devices having an anode, a cathode and a control element and each of said rectifiers being capable of being either in a conducting or a non-conducting condition, means including a series connected diode and capacitor connected between the anodes of rectifier devices in succeeding stages, reset means for simultaneously applying a reset impulse to the control elements of a plurality of said rectifier devices to cause said plurality to conduct, means for blocking the reset impulse from being applied to the control element of a selected one of said rectifier devices to prevent said selected rectifier device from conducting, other means for simultaneously applying a control impulse to the control element of all of said rectifier devices to cause said formerly non-conducting device to go to a conducting condition, conduction of said formerly non-conducting device in combination with the aforesaid series circuit connecting its anode to the anode of the succeeding rectifier device causing the capacitor in said series circuit to discharge and to dissipate the charge on the anode of the succeeding rectifier device to stop said succeeding rectifier device from conducting, each succeeding formerly non-conducting rectifier causing the rectifier in the succeeding stage to stop conducting when it is made conducting by receipt at its control element of another control impulse, and means for applying subsequent control impulses to the control element of the then non-conducting rectifier device so that a different rectifier device becomes non-conducting with the occurrenece of each new control impulse.

9. A ring counter comprising a plurality of circuit stages each including a silicon controlled rectifier device having an anode element, a control element, and a grounded element, said rectifier devices being capable of being either in a conducting or a non-conducting condition, means coupling said stages together in tandem into a closed circuit, means for simultaneously applying a control impulse to the control elements of a plurality of said rectifier devices to cause said devices to go into a conducting condition, other means preventing at least two of said rectifier devices from conducting, said two last-named device being separated by at least one circuit stage therebetween, and means for simultaneously applying another control impulse to the control elements of said then non-conducting rectifier devices whereby said devices are changed to a conducting condition, each of said stages including circuit means coupling it to a succeeding stage, said circuit means including a capacitor and a diode connected between the anode elements of the rectifier devices in the succeeding circuit stages, the circuit means connected between the anodes of the non-conducting devices and the conducting devices in the succeeding stages dissipating the anode voltages of devices in the succeeding stages when the non-conducting devices go into a conducting condition to cause the rectifier devices in the said succeeding stages to change from a conducting to a non-conducting condition each succeeding control impulse repeating the operation with the then non-conducting devices to progress the non-conducting stages one stage at a time in sequence around the closed circuit.

10. The ring counter defined in claim 9 wherein an indicator device is associated with each of said stages to indicate the condition thereof, each of said indicator devices being energized when the associated stage is in a conducting condition.

11. The ring counter circuit defined in claim 9 wherein each of said stages has an output connected to an individual associated load circuit.

12. The ring counter circuit defined in claim 9 including a reset stage having a semi-conductor device including an anode element, a control element, and a grounded element, a source of reset pulses for controlling said reset stage, and means for applying said reset pulses to a predetermined number of the control elements in the circuit stages to establish a predetermined reset condition for the ring counter.

13. The ring counter circuit defined in claim 9 wherein said semi-conductor devices are silicon controlled rectifiers.

14. A bi-stable trigger circuit for use as one stage of a multi-stage counter circuit comprising a silicon controlled rectifier having a cathode, an anode, and a gate, a first junction connected to the cathode, a first resistor connected between said first junction and the gate, a second junction including a source of positive potential connected thereto, a second resistor in parallel with a series circuit including a third resistor and a rectifier element connected between said second junction and the anode, said rectifier element being connected to permit conduction of current from the said second junction to the anode, a commutating-pulse terminal including means connecting said terminal to the second junction, a first capacitor connected between said commutating-pulse terminal and the third resistor on the side thereof that is connected to said rectifier element, a switching-pulse input terminal including a source of input impulses, and a second capacitor connected between said switching-pulse input terminal and the said gate.

References Cited

UNITED STATES PATENTS

| | | | |
|---|---|---|---|
| 2,402,372 | 6/1946 | Compton et al. | 315—84.5 |
| 3,119,058 | 1/1964 | Genuit | 307—305 X |

FOREIGN PATENTS

| | | |
|---|---|---|
| 934,481 | 10/1955 | Germany. |

ARTHUR GAUSS, *Primary Examiner.*

ROBERT H. PLOTKIN, *Assistant Examiner.*